July 12, 1960     B. H. PINCKAERS     2,945,133
TRANSISTOR CIRCUIT
Filed Nov. 14, 1955

*INVENTOR.*
BALTHASAR HUBERT PINCKAERS

BY Joseph E. Ryan

*ATTORNEY*

United States Patent Office 2,945,133
Patented July 12, 1960

2,945,133

TRANSISTOR CIRCUIT

Balthasar Hubert Pinckaers, Hopkins, Minn., assignor to Minneapolis-Honeywell Regulator Company, Minneapolis, Minn., a corporation of Delaware Filed Nov. 14, 1955, Ser. No. 546,588

5 Claims. (Cl. 307—88.5)

The novel device disclosed is a transistor bridge-amplifier and more particularly is a device having a bridge and amplifier circuit which utilizes a single source of power.

In the control of an amplifier from a bridge or signal source it has normally been neecssary to supply two independent power supplies for the overall circuit. A single power supply for the bridge or signal source, and for the amplifier has been found impractical because of the inter action of the supplies and the inability to properly ground both units.

It is an object of the present invention to provide an amplifier which can be controlled from a signal source, wherein the amplifier and signal source have a common source of power.

It is an additional object of the present invention to disclose a transistor amplifier which can be controlled from a resistance bridge network and which utilizes a single source of direct current potential.

It is a further object of this novel device to utilize a bridge-amplifier of exceedingly simple design and which limits the number of necessary components far beyond that which is possible in a conventional circuit design.

It is still another object of this novel circuitry to provide means for operation of a relay or similar control device, such that the power drain by the sensing element from the source, is exceedingly small.

These and other objects will become apparent from considering the following specification when considered with the drawings attached hereto, wherein.

Figure 1:
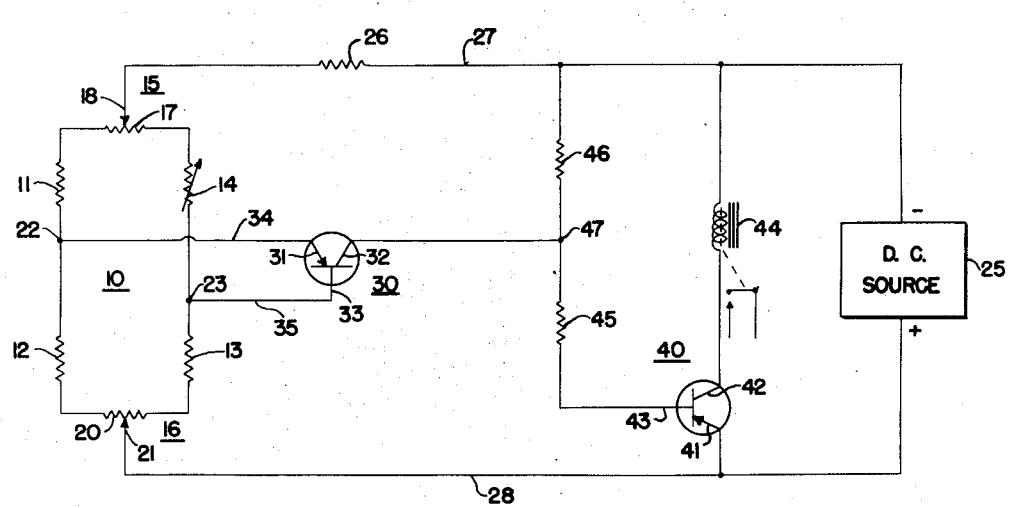
Figure 1 is a complete schematic of a preferred embodiment.

In the preferred embodiment disclosed a resistance type bridge circuit is shown generally at 10. This bridge consists of three fixed resistors 11, 12, and 13. A fourth resistor 14, is of a type which varies with temperature. Resistor 14 could have either a positive or negative temperature coefficient depending on the application of the input bridge 10. Also included in the bridge circuit are two potentiometers generally shown at 15 and 16. These potentiometers are utilized for calibration and electrical centering of the bridge circuit 10. Potentiometer 15 consists of a resistance element 17 and a slider 18, and potentiometer 16 consists of a resistance element 20 and a slider 21. In general, the power input to the bridge 10 is supplied between the sliders 18 and 21, and the output of the bridge is taken between the junctions 22 and 23 which occur between the resistors 11 and 12, and resistors 13 and 14.

A direct current source 25 has its negative terminal connected to slider 18 through voltage dropping resistor 26 and conductor 27, while the positive side of source 25 is connected to slider 21 by conductor 28. As will be described in more detail below, the direct current source 25 also supplies the necessary potential to the remainder of the amplifier circuit.

A PNP type transistor 30 having an emitter 31, a collector 32 and a base 33 is connected in a grounded base configuration. In this grounded base configuration the emitter 31 is connected by conductor 34 to junction 22 to one side of the output of bridge 10, while base 33 is connected via conductor 35 to the junction 23 of the other output side of the bridge 10. It is understood that the PNP type transistor can be replaced by any suitable type of current control means. A second PNP type transistor 40 having an emitter 41, a collector 42, and a base 43 is utilized as an amplifier output stage and is connected in a grounded emitter configuration. In the connection of the transistor 40 the emitter 41 is directly connected to conductor 28, which forms part of the positive terminal of the direct current source 25. The collector 42 is connected through a relay winding 44 to the negative side of the direct current source 25, at conductor 27. Base 43 of transistor 40 is connected through bleeder resistances 45 and 46 to the negative side of the direct current source 25. The circuitry is completed by connecting collector 32 of transistor 30 to a junction 47 which occurs between bleeder resistors 45 and 46.

Figure 2:
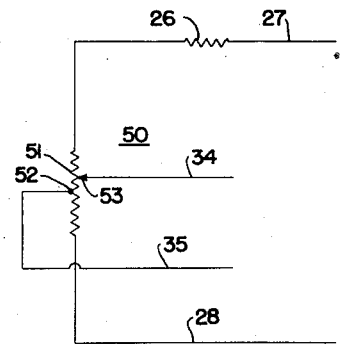
Figure 2 is a schematic of another signal source for use with the embodiment of Figure 1 and the same numbers are used for identical components.

In Figure 2 there is disclosed a signal source 50, which can provide the same function as the bridge 10 of Figure 1. In considering the signal source 50, identical numbers have been shown to illustrate how the source 50 can be used to replace the bridge 10. The source 50 includes resistor 51, which is tapped at 52, and a slider 53.

Operation

In considering the operation of the novel circuitry of Figure 1 it will be assumed that the bridge 10 is balanced, and therefore no potential exists between junctions 22 and 23 of bridge 10. With this arrangement, a steady state current exists in both transistors 30 and 40 and the relay 44 is energized with its load contacts open. The steady state current out of collector 32 of transistor 30 is very small (its leakage current) under the conditions assumed and under these conditions the current in relay winding 44 is sufficiently large to cause it to be energized. If a temperature change occurs which causes the resistance of 14 to shift in such a manner that junction 22 becomes positive with respect to junction 23, the bridge unbalance is then directly applied between the emitter 31 and base 33 of transistor 30. Under these conditions the PNP transistor 30 conducts more readily from base 33 to collector 32 and the current flow passes through junction 47 and resistor 46 to the power source 25. This flow of current causes a greater drop to exist across resistor 46 and thereby decreases the voltage which appears between junction 47 and emitter 41 of transistor 40. The decrease of voltage from junction 47 to emitter 41 of the PNP transistor 40 causes the transistor to decrease the conduction between emitter 41 and collector 42 through the relay 44. This in turn causes the relay to operate. The operation of the relay then controls a device (not shown) which attempts to return the temperature at resistor 14 to a condition which would tend to balance the bridge 10. When a balance at bridge 10, between terminals 22 and 23 is established, the circuitry returns to its steady state condition and relay 44 is again energized.

The signal source 50 shown in Figure 2 causes the same type of operation as the bridge 10. In the case where the signal source 50 is varied by movement of slider 53, the operation of relay 44 can cause means (not shown) to mechanically move slider 53 to a position of rebalance. It is clear that numerous types of signal sources or bridge type networks could be used to vary the input to transistor 30 and thereby cause operation of relay 44 and associated control or rebalance means.

The circuitry shown and described in this specification is of the preferred embodiment but the applicant does not with to be limited to this particular configuration. It is understood that the teaching disclosed would allow those versed in the art to prepare many modifications and therefore the applicant wishes only to be limited by the appended claims.

I claim as my invention:

1. In a control circuit: a source of direct current potential; an impedance bridge type circuit having a condition responsive member, said bridge type circuit having input junctions connected to said source of potential and having output junctions, a change of said condition being effective to provide an output signal from said circuit without any change in the potential of said source; a PNP transistor having an emitter, a collector, and a base wherein said base and emitter are connected to said bridge output junctions; a second PNP transistor having an emitter, a base, and a collector wherein said emitter and collector form a series circuit with a relay winding and are connected across said source; a serially connected pair of resistors joined to said second transistor base electrode and to said source of power at a junction common with said relay winding; and said first collector connected to a common junction of said resistors.

2. In a circuit of the class described, an electrical temperature responsive bridge circuit containing input and output means, said bridge circuit including a temperature responsive element; a source of power connected in circuit with said input means for energizing said bridge circuit; a transistor having a plurality of electrodes including input and output electrodes wherein said input electrodes are connected to said bridge output means; a second transistor having a plurality of electrodes including input and output electrodes wherein said output electrodes are connected in a series circuit with control means and said source; impedances connecting a second transistor input electrode to said power source, and means connecting a first transistor output electrode in circuit with said impedances.

3. In a circuit of the class described, a bridge-type condition responsive network having input and output means, said network having a condition responsive member; a source of power connected to said input means; first semi-conductor means having a plurality of electrodes including input and output electrodes wherein said input electrodes are connected to said network output means; current responsive control means; second semi-conductor means having a plurality of electrodes including input and output electrodes wherein said output electrodes are connected in series circuit with said control means and said source; impedance means connecting a second semi-conductor input electrode to said source, and means connecting a first semi-conductor output electrode in circuit with said impedance means.

4. In electrical control apparatus having but one direct current potential source for energizing both a direct coupled amplifier and an associated direct current signal producing network, the combination comprising: a direct current potential source having a pair of terminals one of its terminals being connected to a common conductor; semiconductor amplifying means having output terminals and having a pair of signal input terminals electrically remote from said common conductor; a network type circuit for producing an electrical output signal in response to a condition, said circuit having a condition responsive member and having input terminals and output terminals; means for connecting the input terminals of said network type circuit to the terminals of said source of direct current potential, the potentials of said output terminals of said network type circuit being remote from said common conductor potential; means directly connecting the ouput terminals of said network type circuit to the input terminals of said semiconductor amplifying means in current controlling relation thereto; and circuit means connecting the output terminals of said semiconductor amplifying means to the terminals of said source.

5. In electrical control apparatus having but one direct coupled potential source for energizing both a direct coupled amplifier and an associated direct current signal producing network, a combination comprising: multi-stage direct coupled semi-conductor amplifier means comprising at least a first and a second semi-conductor amplifier device, said first device having a plurality of electrodes including a first, second, and third electrode, said second device having a plurality of electrodes including output electrodes and an input electrode; means providing direct current coupling between the first electrode of said first semi-conductor device and the input electrode of said second semi-conductor device; direct current impedance bridge type means having input terminals and output terminals, said bridge type means having a condition responsive member and becoming electrically unbalanced in response to said condition to provide an output signal; a single source of direct current potential for energizing said semi-conductor amplifying means and said bridge type means; load means; means directly connecting the output terminals of said bridge type means, respectively, to the second and third electrodes of said first semi-conductor device; means connecting the input terminals of said bridge type means to said single direct current source; and means including said load means connecting the output electrodes of said second semi-conductor device to said single source.

References Cited in the file of this patent

UNITED STATES PATENTS

| | | |
|---|---|---|
| 2,423,478 | Busse et al. | July 8, 1947 |
| 2,569,345 | Shea | Sept. 25, 1951 |
| 2,680,186 | Pridmore | June 1, 1954 |
| 2,718,613 | Harris | Sept. 20, 1955 |
| 2,751,545 | Chase | June 19, 1956 |
| 2,751,549 | Chase | June 19, 1956 |
| 2,751,550 | Chase | June 19, 1956 |
| 2,777,092 | Mandelkorn | Jan. 8, 1957 |
| 2,786,964 | Dewitt | Mar. 26, 1957 |
| 2,828,450 | Pinckaers | Mar. 25, 1958 |

OTHER REFERENCES

B. L. Andrews, B. Sc., "The Thermistor in Biological Research," September 1947, Electronic Engineering.